Patented Nov. 10, 1942

2,301,532

UNITED STATES PATENT OFFICE 2,301,532

BIOLOGICAL PRODUCT AND PROCESS OF OBTAINING SAME

Norbert H. Fell, Detroit, Mich., assignor to Parke, Davis & Company, Detroit, Mich., a corporation of Michigan No Drawing. Application August 18, 1938, Serial No. 225,612

8 Claims. (Cl. 167—78)

The invention relates to preparation of products useful in preventing the allergic symptoms to which many people are subject as the result of their sensitivity to specific sensitizing substances. The invention relates more particularly to an antigenic product which can be artificially or synthetically produced and which is useful for developing either active or passive immunity in sensitized individuals.

It has been shown that histamine or related substances can be found in the blood of animals during anaphylactic shock. I have now found that it is possible to produce both active and passive immunity against histamine and similar substances produced during manifestation of the symptoms of anaphylaxis and other allergic reactions whereby it is possible for sensitive individuals to avoid allergic reactions, regardless of the type of allergens to which they are sensitive.

In carrying out the invention I combine histamine, or like substance produced in the body during an allergic reaction, with a large molecule or particle in a haptenic or haptene-like linkage to form a complex which can be used as an antigen for developing active immunity in the body of a sensitized individual, or for injecting into animals from which an antiserum can thereafter be obtained containing an antibody for neutralization of the effects of histamine or histamine-like substances.

My invention makes possible a type of treatment of allergic conditions which is non-specific and does not depend upon recognition and protection against the individual allergens which may produce symptoms in any given case.

The preferred method of carrying out the invention is to prepare a diazotized derivative of histamine itself and couple the latter with a protein molecule. This may be done in various ways. For example, the amino group of histamine can be combined through an amide linkage with an aliphatic or aromatic carboxylic acid containing an amino group or a nitro group capable of reduction to an amino group, and the amino amide thereby formed diazotized at the free amino substituent and the resulting diazo compound coupled with a protein to give a histamine-azo-protein complex useful in producing active and passive immunity to histamine and like substances responsible for the manifestations of allergy.

The invention in its broader aspects is described and claimed in my copending application, Serial No. 371,456, filed December 23, 1940. The instant application is directed more particularly to that species of the invention in which the protein coupled to the histamine di-azo compound is casein or egg albumin, preferably casein, and the claims in the instant application are limited to such species.

The invention may be illustrated by the following examples.

EXAMPLE 1.—*Preparation of a nitro benzamide intermediate*

Two moles of histamine base are dissolved in hot dry chloroform and a solution of one mole of p-nitro benzoyl chloride dissolved in ether is stirred in. A heavy precipitate forms immediately which has a waxy appearance. The supernatant liquid layer is removed from the precipitate and centrifuged to remove all insoluble material. The precipitate is dissolved in boiling water, filtered while hot from any material which fails to dissolve, and the filtrate cooled to give crystals of the imidazolyl ethyl p-nitro benzamide. The crystals can be washed with acetone and ether and then dried at 110° C. They melt at 204° C. The compound prepared by this example can be represented by the formula,

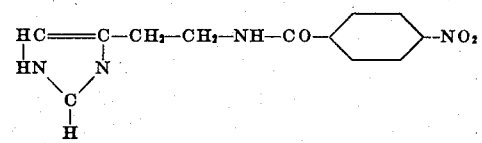

An analysis of the crystalline product gives the theoretical amount of nitrogen for a compound of this formula.

EXAMPLE 2.—*Preparation of an amino benzamide compound*

One-half gram of imidazolyl ethyl p-nitro benzamide, prepared as in Example 1, is added to 50 cc. of a hot solution of 3.5 grams of ferrous sulfate ($FeSO_4.7H_2O$). 35 cc. of a 2.5% solution of ammonium hydroxide are then gradually added to the ferrous sulfate solution while heating on the steam bath. After adding all the ammonium hydroxide solution, the reaction mixture is heated for 30 minutes and the ferric hydroxide filtered off and the filtrate set aside to cool. The filtrate contains the imidazolyl ethyl p-amino benzamide. This compound may be obtained in solid form by allowing the filtrate to stand whereupon spontaneous crystallization sometimes occurs, or, evaporating off the solvent, or adding an organic solvent in which the amino benzamide is insoluble, thereby obtaining a precipitate or crystals which can be filtered off.

The crystals have a melting-point of 180–182° C. and differ from the corresponding p-nitro compound in being very soluble in acid and very insoluble in alkali. The product of this example is represented by the formula,

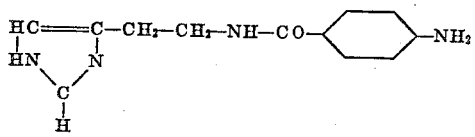

EXAMPLE 3.—*Preparation of diazo compound of imidazolyl ethyl p-amino benzamide*

The filtrate from Example 2 containing the imidazolyl ethyl p-amino benzamide is neutralized with hydrochloric acid and 173 mgms. of sodium nitrite added while chilling the reaction mixture in an ice-salt mixture. The reaction mixture is acidified with 4.5 cc. of normal HCl and allowed to stand for about 20 minutes. It contains the diazotized imidazolyl ethyl p-amino benzamide.

EXAMPLE 4.—*Preparation of a histamine-azo-protein antigen*

Five grams of casein are taken up in 50 cc. of cold water and 50 cc. of boiling water added. The solution is then adjusted to a pH of 8.1–8.2 with 10% sodium hydroxide solution. This alkaline casein solution is chilled in an ice-bath. A solution of a diazonium salt of imidazolyl ethyl p-amino benzamide, prepared for instance as described in Examples 1, 2 and 3 and starting with about 830 mgms. of histamine base, is added slowly to the chilled casein solution. More 10% NaOH is added until the mixture turns a blood-red color. Any insoluble material present at this stage can be centrifuged off and discarded. An excess of hydrochloric acid is added to the supernatant liquid until it becomes acid to Congo red paper. This acidification causes a heavy flocculent precipitate to come out. The precipitate is centrifuged off. The centrifuged precipitate is washed with acidified saline and then dissolved in excess dilute alkali hydroxide to give a clear blood-red solution. To this solution, 0.5% phenol is added and then a few drops of concentrated HCl to bring the pH to about 7.6, after which the solution is put through a Mandler filter. The solution is ampouled and can be submitted to sterility tests before using it for injections.

This antigen injected into animals sensitized to horse serum confers on them protection against subsequent anaphylactic shock from horse serum. Animals can be immunized with this histamine-azo-protein antigen; they can be bled subsequently, and their blood serum can be shown to contain antibodies against the complex antigen and against histamine. Such an immune serum injected into guinea-pigs sensitized to horse serum provides them with protection (passive immunity) against subsequent anaphylactic shock from horse serum.

Human subjects may also be treated in the same manner as animals to give them an active or a passive immunity which enables them to avoid the uncomfortable and deleterious symptoms accompanying allergic reactions.

Instead of using casein in this example, I may use some other protein, such as egg albumin or large organic molecules capable of coupling with a histamine-diazo compound or like combination of histamine or histamine-like compound with a diazotized amino compound.

Instead of using nitro benzoyl chloride, other nitro organic acid halides may be used to combine with the histamine to form an amide combination capable of reduction to give an free amino group for purposes of diazotization.

The invention is not limited to any particular method of producing the histamine amide intermediate. The essential feature of the preferred form of the invention is to produce a derivative of histamine containing an amino group, other than the amino group of histamine, which can be diazotized to give a diazonium salt for purposes of coupling with the protein or like organic molecule.

Although I prefer to make a histamine-azo-protein complex as an antigen for the development of immunity against the deleterious products, such as histamine itself, produced in the human body during an allergic reaction, the invention is not limited to use of such combinations of histamine and similar compounds. It also embodies various loose combinations of histamine, either chemical or physical in nature, or both, with a larger molecule or particle. For example, histamine may be absorbed on kaolin or other colloidal organic or inorganic substance in a combination which is probably more physical than chemical in nature, and this absorbed combination can be injected into animals which, after a time, will yield an antiserum to histamine itself.

In the claims appended hereto the expression "animal body" is intended to include the human body as well as the bodies of animals.

What I claim as my invention is:

1. Method of producing immunity against histamine which comprises combining histamine with an amino-substituted carboxylic acid by way of the amino group of histamine to form an amino amide of histamine, diazotizing said amino amide, chemically coupling the diazotized compound with a protein of the class consisting of casein and egg white to form an antigenic complex, and administering said complex to an animal body for the development therein of an active immunity against histamine.

2. Method of producing immunity against histamine which comprises combining histamine with a p-nitro benzoyl halide to form an imidazolyl ethyl p-nitro benzamide, reducing the nitro group of the latter to an amino group with production of the corresponding amino amide, diazotizing said amino amide, chemically coupling the diazotized amino amide with a protein of the class consisting of casein and egg white to form an antigenic complex, and administering said complex to an animal body for the development therein of an active immunity against histamine.

3. Method of producing immunity against histamine which comprises combining histamine with p-nitro benzoyl chloride to form imidazolyl ethyl p-nitro benzamide, reducing the nitro group of the latter to an amino group with production of imidazolyl ethyl p-amino benzamide, diazotizing said amino amide, chemically coupling the diazotized amino amide with caseing to form an antigenic complex, and administering said complex to an animal body for the development therein of an active immunity against histamine.

4. The product of chemically coupling a protein of the class consisting of casein and egg white with a diazotized amino-substituted carboxylic acid amide of histamine.

5. The product of chemically coupling a protein of the class consisting of casein and egg white with a diazotized imidazolyl ethyl p-amino benzamide.

6. The product of chemically coupling casein with diazotized imidazolyl ethyl p-amino benzamide.

7. Method of producing immunity against histamine which comprises combining histamine with an amino-substituted carboxylic acid by way of the amino group of histamine to form an amino amide of histamine, diazotizing said amino amide, chemically coupling the diazotized compound with casein to form an antigenic complex, and administering said complex to an animal body for the development therein of an active immunity against histamine.

8. The product of chemically coupling casein with a diazotized amino-substituted carboxylic acid amide of histamine.

NORBERT H. FELL.